United States Patent [19]

Ryan

[11] Patent Number: 5,255,534
[45] Date of Patent: Oct. 26, 1993

[54] SYSTEM AND PROCESS FOR OPERATING AND ABSORPTION CYCLE AROUND A CRYSTALLIZATION CURVE OF THE SOLUTION

[75] Inventor: William A. Ryan, Chicago, Ill.

[73] Assignee: Gas Research Institute, Chicago, Ill.

[21] Appl. No.: 909,801

[22] Filed: Jun. 25, 1992

[51] Int. Cl.⁵ .............................................. F25B 15/00
[52] U.S. Cl. ........................................ 62/476; 62/489
[58] Field of Search ................ 62/476, 101, 103, 105, 62/483, 484, 489, 141

[56] References Cited

U.S. PATENT DOCUMENTS

| | | | |
|---|---|---|---|
| 3,426,548 | 2/1969 | Greacen | 62/101 |
| 3,597,936 | 8/1971 | Dyre et al. | 62/474 |
| 3,604,216 | 9/1971 | Porter | 62/148 |
| 3,626,710 | 12/1971 | Porter | 62/476 |
| 3,626,711 | 12/1971 | Porter | 62/476 |
| 3,742,728 | 7/1973 | Mamiya | 62/476 |
| 4,003,215 | 1/1977 | Roach | 62/476 |
| 4,246,762 | 1/1981 | Bourne | 62/148 |
| 4,290,273 | 9/1981 | Meckler | 62/148 |
| 4,337,625 | 7/1982 | Wilkinson | 62/79 |
| 4,458,500 | 7/1984 | Grossman et al. | 62/238 |
| 4,484,456 | 11/1984 | Reimann | 62/476 |
| 4,791,790 | 12/1988 | Tongu | 62/476 |
| 4,877,080 | 10/1989 | Ryham | 165/2 |
| 4,921,515 | 5/1990 | Dao | 62/335 |
| 5,016,445 | 5/1991 | Wehr | 62/101 |
| 5,016,448 | 5/1991 | Plzak | 62/476 |
| 5,044,174 | 9/1991 | Nagao | 62/476 |
| 5,127,234 | 7/1992 | Woods | 62/101 |

Primary Examiner—Albert J. Makay
Assistant Examiner—William C. Doerrler
Attorney, Agent, or Firm—Speckman, Pauley & Fejer

[57] ABSTRACT

An absorption system and process that operates around a crystallization curve of a solution with a crystallization limitation. At least a portion of dilute solution discharged from an absorber is mixed with relatively strong absorbent flowing from a generator. The mixture is controlled so that the cycle steps around the crystallization curve of the solution. One preferred solution is water-lithium bromide. One preferred strong/weak concentration of the water-lithium bromide solution is approximately 66%/62%. A preferred operating concentration bandwith of the water-lithium bromide solution is approximately 4%. A solution heat exchanger independent from the absorber is positioned upstream from the absorber and is used to transfer heat from the mixture of the relatively strong absorbent and the diluted solution to either a heat rejection mechanism or a heat collection mechanism. Two preferred absorber mechanisms include a spray absorber and a rotating disk distribution absorber.

33 Claims, 4 Drawing Sheets

SYSTEM AND PROCESS FOR OPERATING AND ABSORPTION CYCLE AROUND A CRYSTALLIZATION CURVE OF THE SOLUTION

BACKGROUND OF THE INVENTION

1. Field of the Invention

This invention relates to a modified absorption system and process that operates around a crystallization curve of a solution with a crystallization limitation.

2. Description of Prior Art

Conventional absorption refrigeration cycles are well known to those persons skilled in the art of heating, air conditioning and refrigeration. A known system based upon such conventional absorption cycles uses a solution that contains a refrigerant and an absorbent. The refrigerant typically flows from a generator to a condensor, an evaporator, an absorber, a solution pump, and then back to the generator. The absorbent typically flows from the generator to the absorber and then back to the generator, by way of the solution pump.

A conventional cycle for a water-absorption refrigeration machine, that operates with water-lithium bromide as the solution, also includes a liquid heat exchanger for transferring heat between the absorbent and the refrigerant-absorbent streams. However, when using water-lithium bromide as the solution, conventional cycles must be operated so that crystallization of the salt does not occur, particularly during shutdown of the system. Thus, in actual practice of such conventional cycles, relatively low concentrations of lithium bromide solutions are commonly used in small commercial units to insure against crystallization of the salt. Typical relatively low concentrations of 54% and 58.5% are used in such conventional cycles. Higher concentrations, such as about 60% and 64.5% are used in larger commercial units so that the absorber can be operated at a higher temperature. In order to avoid crystallization of the salt, controls and a shutdown dilution cycle are commonly used with such larger commercial units.

U.S. Pat. No. 5,016,448 discloses an internal heat exchanger for an absorption apparatus. A strong solution is drawn into an eductor which also receives a supply of weak solution from a pump. The strong solution is mixed with the weak solution at the eductor to form an intermediate solution having a concentration between the concentrations of the strong solution and the weak solution. The intermediate solution is discharged from the eductor and supplied to a manifold which includes several spray nozzles that distribute the intermediate solution over coils within the absorber.

U.S. Pat. No. 5,044,174 teaches an absorption type refrigerating machine wherein the solution is pumped from a first absorber stage directly to a spray nozzle within a second absorber stage. The first absorber stage is combined with a first evaporator stage and the second absorber stage is combined with a second evaporator stage to respectively form separate units.

U.S. Pat. No. 5,016,445 teaches an absorption apparatus wherein one pump transfers fluid from an absorber reservoir at the bottom of an inner cylindrical house to a generator reservoir at the bottom of an outer spherical house. Another pump transfers fluid from the generator reservoir to absorber spray heads which are positioned within the inner cylindrical house. An evaporator is positioned beneath the condensor in the housing for receiving refrigerant liquid from the condensor and for vaporizing the refrigerant to create a refrigerant effect.

U.S. Pat. No. 4,484,456 discloses a triple loop heat exchanger for an absorption refrigeration system which includes a bypass for conducting strong solution from a generator directly to an absorber of the refrigeration system, when strong solution builds to an undesirable level in the generator. Solution within the absorber passes through two heat exchangers in series and then into a generator.

U.S. Pat. No. 4,921,515 teaches a regenerative absorption refrigeration cycle having a plurality of subcycles. The lowest subcycle is a single-effect regenerative absorption cycle. One of the subcycles is a single-effect absorption topping cycle which includes an absorber. A pump is connected between an absorber outlet and a boiler inlet to pump fluid from the absorber back into the boiler.

U.S. Pat. No. 4,246,762 discloses an absorption refrigeration system having a generator section and an absorber section wherein all of the solution from the absorber section is pumped through a heat exchanger and into the generator section. U.S. Pat. No. 4,458,500 teaches an absorption heat pump cycle wherein absorbent solution which is diluted in an absorber accumulates in the bottom of the vessel and the diluted absorbent liquid flows through conduits to a desorber. The diluted absorbent is discharged from the desorber in the form of fine droplets.

U.S. Pat. No. 3,597,936 teaches a process and apparatus for continuously purging gases from an absorber and a condensor. Liquid from within an evaporator section is recirculated and sprayed over an exchange coil within the evaporator section. U.S. Pat. No. 4,877,080 teaches a process and apparatus for cooling a fluid by using lower water vapor pressure above a fluid, such as water-salt solutions of lithium bromide. Cooled absorption liquid is fed to an absorber wherein the cooled absorption liquid absorbs moisture from a stream of air.

U.S. Pat. No. 4,337,625 discloses a waste heat driven absorption refrigeration process and system wherein an intermediate absorber and a low absorber are used along with an intermediate desorber and a high desorber. U.S. Pat. No. 3,742,728 teaches a multi-stage absorption refrigeration system which uses different concentrations of lithium bromide solutions.

In view of the discussed teachings of the prior art references and the conventional absorption cycles and systems, it is apparent that there exists a need for an absorption cycle that operates around a crystallization curve of a solution with a crystallization limitation. A system and process that operates according to such modified absorption cycle could simplify the absorber design and thus reduce the material and construction costs of the absorber. Also, such modified absorption cycle could operate with higher concentrations and higher concentration bandwidths, relative to conventional absorption systems, without intersecting the crystallization curve of the solution. By operating with such higher concentrations, particularly by operating around the crystallization curve, the system would require smaller solution heat exchangers and it would be easier to employ air-cooled heat exchangers, as compared to other conventional absorption systems.

SUMMARY OF THE INVENTION

It is one object of this invention to provide a modified absorption process which operates, with a solution that has a crystallization limitation, at conditions that would otherwise cause salts of the solution to crystallize in a conventional absorption cycle.

It is another object of this invention to provide a modified absorption process that combines at least a portion of dilute solution discharged from an absorber with strong absorbent discharged from a generator.

It is still another object of this invention to provide a system that accommodates the modified absorption process of this invention.

It is yet another object of this invention to provide a system wherein the modified absorption process of this invention can be controlled to operate around the crystallization curve of the solution, as a function of the strong/weak concentrations of the solution.

The above and other objects of this invention are accomplished with an absorption system that includes many conventional components. For example, a generator is used to heat the solution and thereby separate the solution into an absorbent and a refrigerant. A condensor is used to condense the separated refrigerant. An evaporator is used to evaporate the condensed refrigerant. An absorber, preferably a spray absorber or an absorber with a rotating disk, is used to absorb the evaporated refrigerant into the absorbent. Also, a solution heat exchanger is used to transfer heat between dilute solution, flowing from the absorber to the generator, and strong absorbent, flowing from the generator to the absorber.

According to one preferred embodiment of this invention, at least a portion of the dilute solution discharged from the absorber is mixed with absorbent flowing from the generator, through the solution heat exchanger, and to the absorber. In another preferred embodiment according to this invention, an additional heat exchanger which is preferably independent from the absorber has one pass which is positioned in the system between an absorber inlet and a mixing point where the dilute solution discharged from the absorber is combined with the strong absorbent discharged from the generator.

In one preferred embodiment of this invention, the other pass of the additional heat exchanger is in circulating communication with a heat rejection mechanism, such as an outdoor fan coil. In another preferred embodiment according to this invention, such other pass of the additional heat exchanger is in circulating communication with a heat collection mechanism, such as an air-cooled absorber cooler.

In another preferred embodiment according to this invention, mixing between the dilute solution and the strong absorbent is accomplished with a balance valve that has a valve inlet in communication with a solution discharge of the absorber, and a valve outlet in communication with an absorbent discharge of the generator. The balance valve can be either a manually or an automatically controlled valve. A constant pressure and constant flow pump is preferably used to transfer the dilute solution from the absorber to the balance valve and back to the generator. The balance valve is preferably positioned between the discharge of such transfer pump and both the absorber inlet and the outlet of the solution heat exchanger that exchanges heat between the dilute solution and the strong absorbent.

According to a preferred embodiment of the absorption process of this invention, the solution is heated to separate the absorbent from the refrigerant. The separated refrigerant is then condensed. The condensed refrigerant is then evaporated. The evaporated refrigerant is absorbed into the absorbent to form the dilute solution which is discharged from the absorber. At least a portion of the dilute solution discharged from the absorber is mixed with the separated strong absorbent discharged from the generator, prior to absorbing the evaporated refrigerant within the absorber. Heat is transferred from the separated absorbent to a remaining portion of the dilute solution flowing back to the generator. In another preferred embodiment according to this invention, further heat is transferred from the mixture of the separated strong absorbent and the dilute solution to either a heat rejection mechanism or a heat collection mechanism.

BRIEF DESCRIPTION OF THE DRAWINGS

Technical, operating and other aspects of this invention will become more apparent from the specification when viewed in conjunction with the drawings wherein.

DESCRIPTION OF PREFERRED EMBODIMENTS

Figure 1:
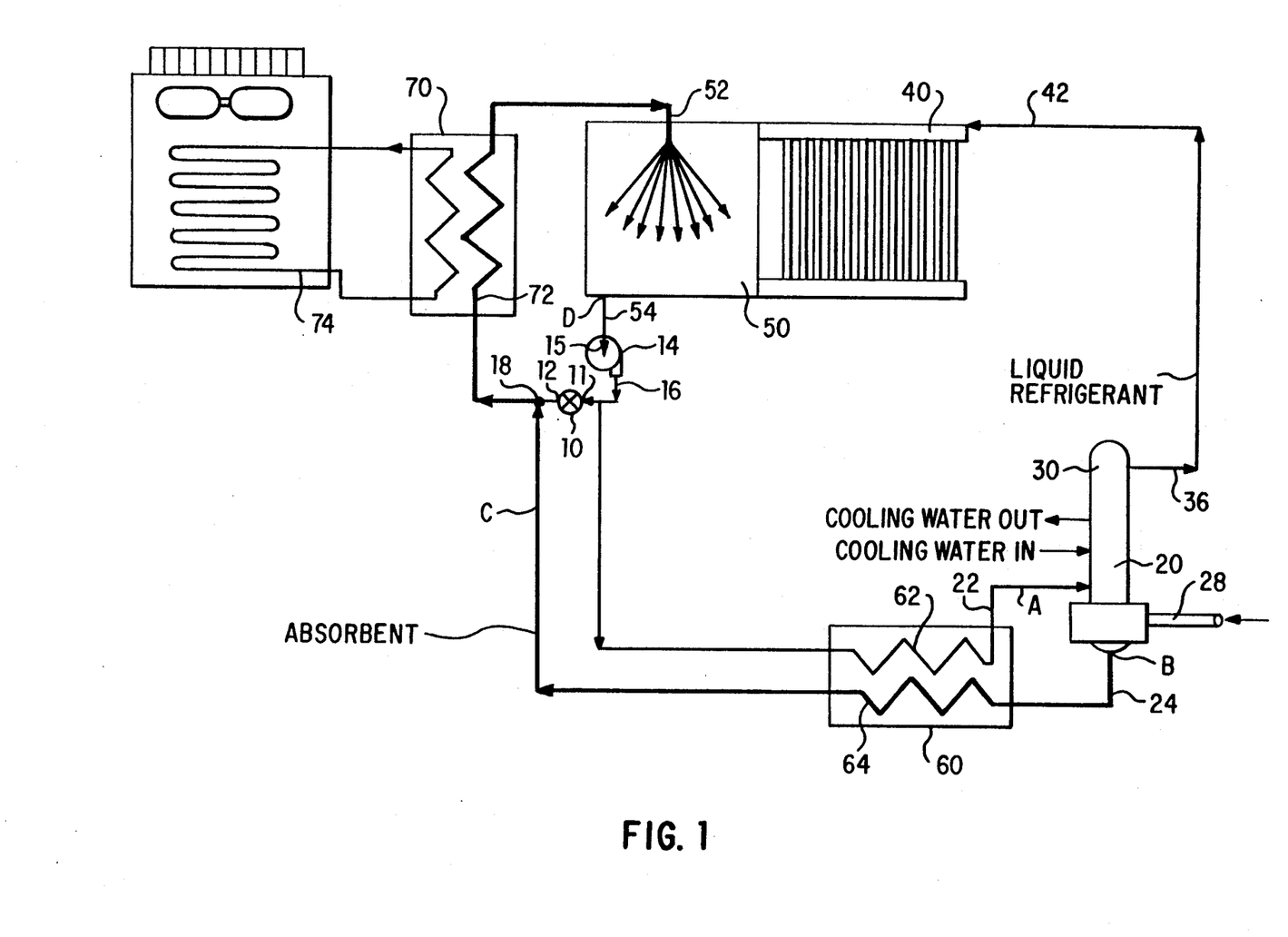
FIG. 1 is a schematic diagram of a modified absorption cycle, according to one preferred embodiment of this invention.

FIG. 1 shows many components of a conventional absorption refrigeration cycle. For example, generator 20, condensor 30, evaporator 40 and absorber 50 are components similar to those of many known absorption refrigeration cycles. When operating such conventional absorption refrigeration cycles with a solution having a crystallization limit, such as water-lithium bromide, heat exchanger 60 is also a known component. This invention relates to a modified conventional absorption cycle wherein solutions with a crystallization limit can have relatively higher strong/weak concentrations and relatively higher concentration bandwidths, due to the controlled mixing of dilute solution discharged from absorber 50 with strong absorbent discharged from generator 20, and/or due to the heat transfer which occurs at heat exchanger 70.

Referring to FIG. 1, generator means, such as generator 20 or any other suitable heating device, is used to heat the solution which enters generator 20 through solution inlet 22. Within generator 20, enough heat is transferred to the solution to separate the solution into refrigerant and strong absorbent. The strong absorbent is discharged from generator 20 through absorbent discharge 24. The refrigerant is discharged from generator 20 through refrigerant discharge 36.

Generator 20 is supplied with heat, as shown in FIG. 1, by fuel flowing through fuel inlet 28. It is apparent that any suitable fuel, such as natural gas or other gaseous, liquid or solid fuels can be used to generate heat within generator 20. It is also apparent that other heat sources such as electricity, steam or any suitable hot liquid or gas can be used to generate heat within generator 20.

Figure 2:
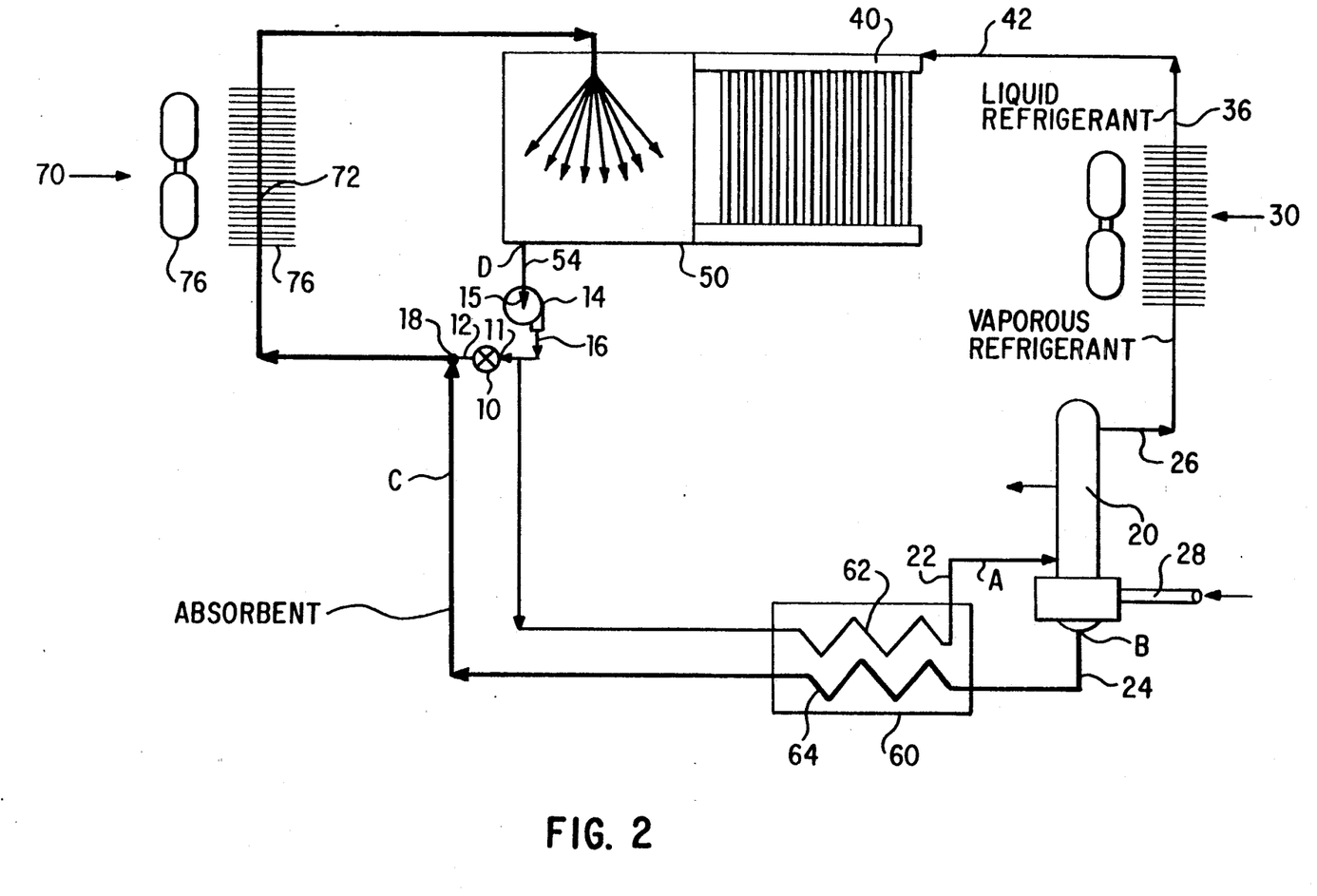
FIG. 2 is a schematic diagram of a modified absorption cycle, according to another preferred embodiment of this invention.

Condensor means, such as condensor 30 or any other suitable condensing device, are used to condense the separated refrigerant. Condensor 30 is in communication with generator 20 and is positioned within the system downstream with respect to generator 20. As shown in FIG. 1, condensor 30 forms an integral unit with generator 20 whereas generator 20 and condensor 30 are separate units as shown in FIG. 2. The refrigerant flows from refrigerant discharge 36 of condensor 30 to refrigerant inlet 42 of the evaporator means. The evaporator means, such as evaporator 40 or any other suitable evaporating device, are used for evaporating the condensed refrigerant. Evaporator 40 is in communication with condensor 30, and is positioned within the system downstream with respect to condensor 30.

The refrigerant flows from evaporator 40 into absorber means wherein the evaporated refrigerant is absorbed into the absorbent. The absorber means, such as absorber 50, comprise absorber inlet 52 and solution discharge 54.

Figure 4:
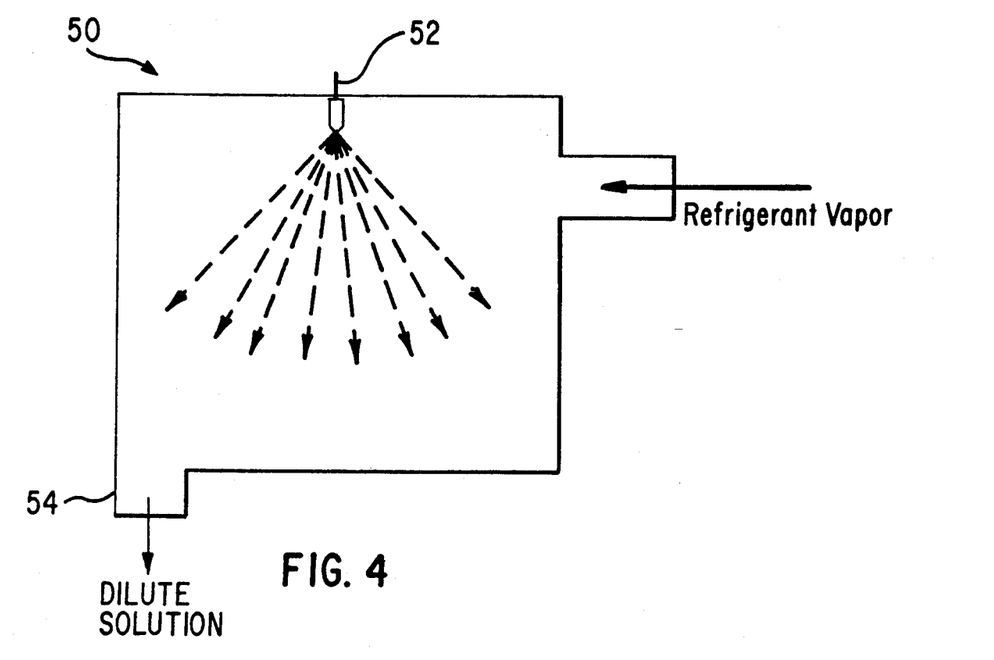
FIG. 4 is a schematic diagram of a spray absorber, according to one preferred embodiment of this invention.
Figure 5:
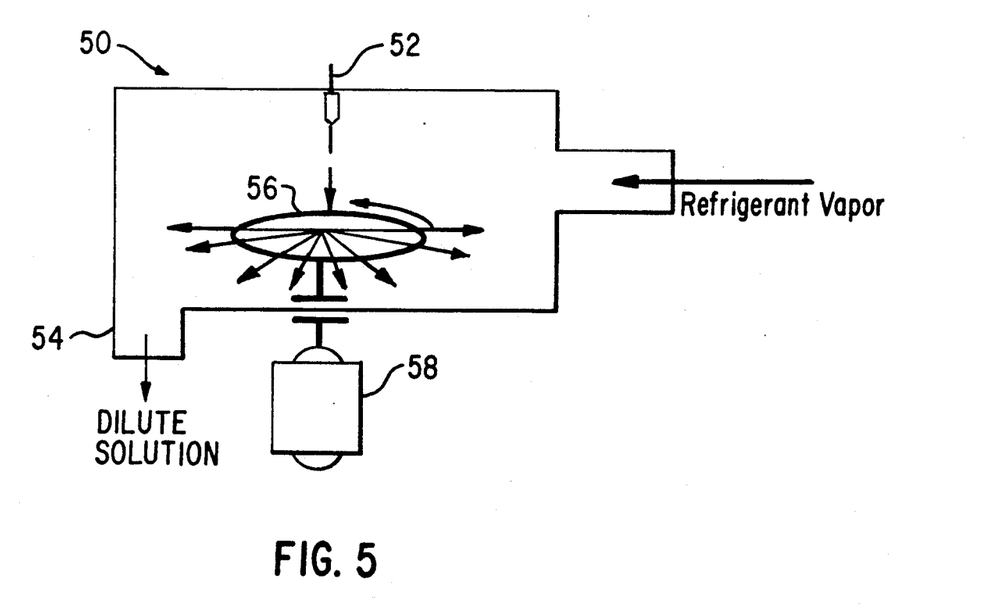
FIG. 5 is a schematic diagram of a spray absorber, according to yet another preferred embodiment of this invention.

It is apparent that absorber 50 can be any suitable absorber known to those skilled in the art. For example, FIG. 4 shows a schematic diagram of a spray absorber which is suitable for use with the absorption system and process of this invention. FIG. 5 shows another schematic diagram of a preferred absorber 50, according to this invention. As shown in FIG. 5, the mixture of the dilute solution and the strong absorbent enters absorber 50 through absorber inlet 52 and is scattered throughout a chamber of absorber 50 by rotating disk 56. Magnetically coupled drive 58 is preferably used to rotate rotating disk 56. However, it is apparent that other mechanical devices can be used to rotate rotating disk 56.

Still referring to FIG. 1, heat exchanger 60 comprises solution pass 62 which communicates between solution discharge 54 of absorber 50, or pump outlet 16, and solution inlet 22 of generator 20. Heat exchanger 60 also comprises absorbent pass 64 which communicates between mixing point 18 and absorbent discharge 24 of generator 20. It is apparent that heat exchanger 70 can be a solution heat exchanger or any other heat exchanger that is suitable for operating within the flow conditions dictated by the modified absorption cycle according to this invention.

Control means are used to mix at least a portion of the dilute solution discharged from absorber 50, through solution discharge 54, with the strong absorbent flowing from absorbent discharge 24 and through absorbent pass 64. As schematically shown in FIGS. 1 and 2, mixing point 18 is the location where the dilute solution and the strong absorbent are combined. It is apparent that the mixing can occur at any position downstream from the discharge of absorbent pass 64 and the discharge at pump outlet 16. According to one preferred embodiment of this invention, balance valve 10 is used to control mixing between the dilute solution and the strong absorbent. As shown in FIGS. 1 and 2, the dilute solution enters valve inlet 11, passes through balance valve 10 and is discharged at valve outlet 12. The strong absorbent is discharged from absorbent discharge 24 and passes through absorbent pass 64, and is then mixed with the dilute solution. The amount of dilute solution that flows through balance valve 10 is adjusted depending upon variables such as the type of solution, the strong/weak concentrations of the solution, flowrates of the dilute solution and the strong absorbent, size of the equipment and other similar technical and process flow limitations of the modified absorption cycle according to this invention.

It is apparent that balance valve 10 can be either manually or automatically controlled. The control means may further comprise a control valve that varies the operating conditions based upon data that can be either manually calculated or calculated with a programmed computer. As shown in FIGS. 1 and 2, balance valve 10 is represented by a simple schematic symbol, but it is apparent that balance valve 10 can operate from various sensed signals of operating conditions throughout the modified absorption system and process according to this invention.

Pump 14 is preferably used to transfer the dilute solution from absorber 50 to generator 20. Balance valve 10 is preferably positioned downstream of pump 14, as shown in FIGS. 1 and 2. However, it is apparent that other fluid transfer means can be used to pump or move the dilute solution from solution discharge 54 of absorber 50 to either balance valve 10, the inlet of solution pass 62 and/or solution inlet 22. It is also apparent that more than one pump can be used throughout the system to accomplish the same result of transferring the dilute solution.

According to another preferred embodiment of this invention, the modified absorption system comprises heat exchanger 70 which is preferably but not necessarily independent from and external with respect to absorber 50. Heat exchanger 70 comprises solution pass 72 which is in communication between mixing point 18 and absorber inlet 52. As shown in FIG. 1, the other pass of heat exchanger 70 is in communication with outdoor fan coil 74. As shown in FIG. 2, such other pass of heat exchanger 70 is in communication with air-cooled absorber cooler 76. It is apparent that any suitable heat rejection mechanism or heat collection mechanism can be used in lieu of outdoor fan coil 74 as shown in FIG. 1 or air-cooled absorber cooler 76 as shown in FIG. 2. The surrounding environment will dictate whether such preferred component is a heat rejection mechanism or a heat collection mechanism. For example, the heat collection mechanism could comprise a heat pump, again depending upon the surrounding environment. Regardless of whether a heat rejection mechanism or a heat collection mechanism is employed in the system, the modified absorption process according to this invention remains the same.

According to the preferred embodiment of this invention as shown in FIG. 2, the modified absorption system also comprises air-cooled condensor 30 which is independent from generator 20. As shown in FIG. 1, generator 20 and condensor 30 are an integral unit. It is apparent that condensor 30 can be any other type of condensor which is suitable for operating within the modified absorption system according to this invention. As shown in FIG. 2, air-cooled condensor 30 has a condensor pass which is in communication between refrigerant discharge 26, as shown in FIG. 2, and refrigerant inlet 42 of evaporator 40.

According to one preferred embodiment of this invention, the modified absorption process or cycle operates around a crystallization curve of the solution wherein the solution is heated to separate an absorbent of the solution from a refrigerant of the solution. The separated refrigerant is then condensed. The condensed refrigerant is then evaporated and the evaporated refrigerant is absorbed into the absorbent to form the solution in a dilute state. At least a portion of the dilute solution is mixed with the separated absorbent prior to absorbing the evaporated refrigerant. Heat is transferred from the separated absorbent to a remaining portion of the dilute solution.

According to another preferred embodiment of this invention, the mixture of the dilute solution and the separated strong absorbent is passed through heat exchanger 70 wherein further heat is transferred from the mixture to a heat rejection mechanism, such as outdoor fan coil 74 or air-cooled absorber cooler 80, or to a heat collection mechanism, such as a heat pump or a low temperature absorption stage in a multi-effect absorption system.

As shown in FIG. 1, the separated refrigerant is transferred to condensor 30 which is an integral unit with generator 20. As shown in FIG. 2, the separated refrigerant is transferred from generator 20 through refrigerant discharge 26 to air-cooled condensor 30, which is an independent unit with respect to generator 20.

Figure 3:
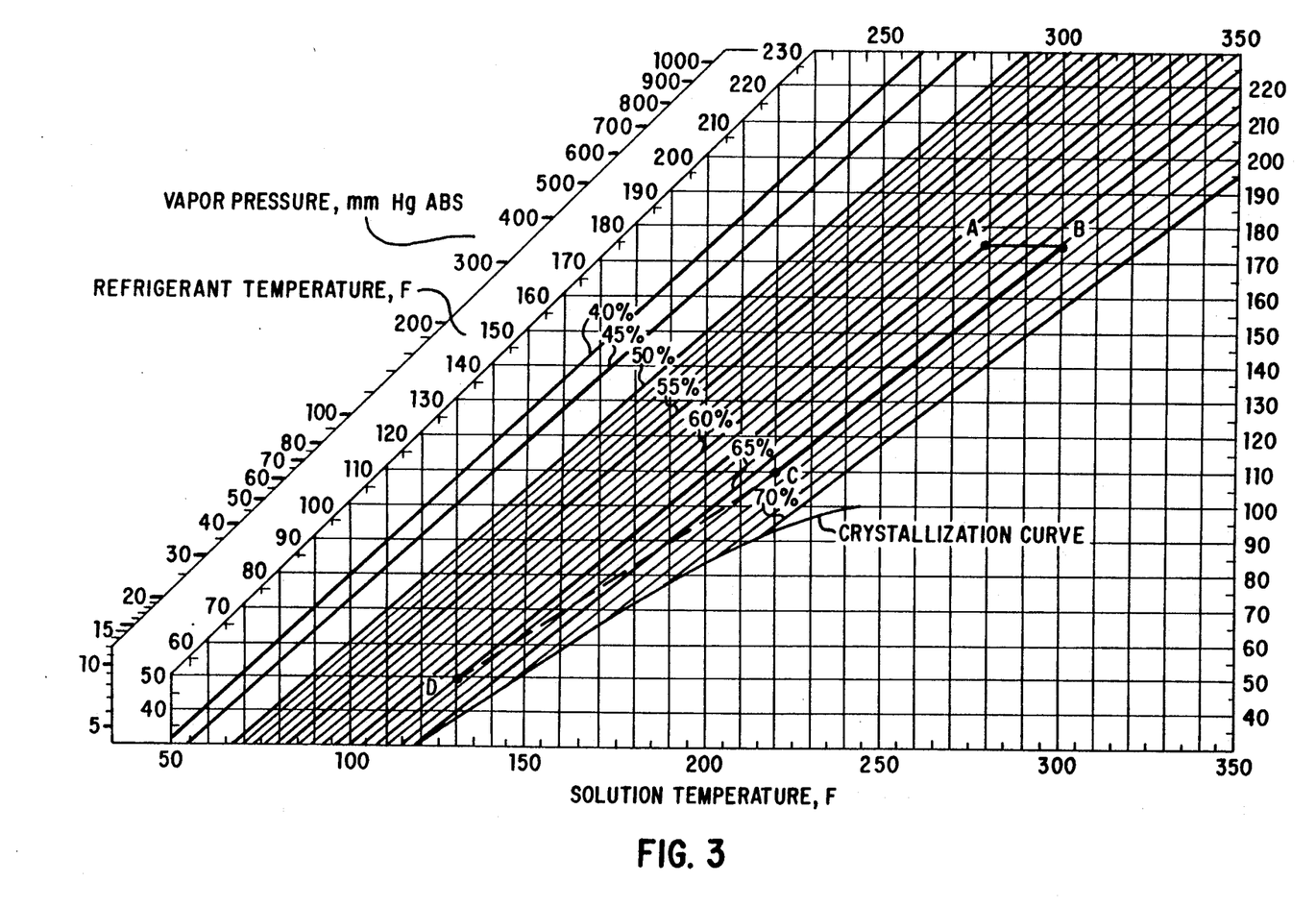
FIG. 3 is an equilibrium chart, taken from ASHRAE Handbook, 1985 Fundamentals Handbook, Chapter 17, page 17.70, for aqueous lithium bromide solutions, showing the cycle operation between points A, B, C and D, according to one preferred embodiment of this invention.

The modified absorption system and process according to this invention operates with a solution that has a crystallization limit. One preferred solution is water-lithium bromide. FIG. 3 shows an equilibrium chart for aqueous lithium bromide solutions. In one preferred embodiment according to this invention, the water-lithium bromide solution has a strong concentration, also referred to in the claims as a separated concentration, of approximately 66%, and a weak concentration, also referred to in the claims as a dilute concentration, of approximately 62%. A concentration bandwith of the water-lithium bromide solution is preferably approximately 4%.

It is apparent that other solutions having a crystallization limit can be used with the system and process of this invention. Other examples of such solutions include lithium chloride and water, sodium hydroxide and water, ammonia and thiocyanate, and other suitable solutions.

Referring to the equilibrium chart for aqueous lithium bromide solutions as shown in FIG. 3, the cycle according to this invention is shown as operating between points A, B, C and D, which correspond to similar points shown in the systems of FIGS. 1 and 2. As shown in FIG. 3, between points C and D, the cycle of this invention operates around the crystallization curve where the salts of the solution crystallize. Under the same process conditions, conventional cycles would operate along line BC until point C would intersect the crystallization curve. It is apparent that operating with balance valve 10 and combining at least a portion of the dilute solution with the strong absorbent at mixing point 18, according to this invention, allows the water-lithium bromide solution, for example, to operate much closer to the crystallization curve than conventional absorption cycles using the same solution with the same strong/weak concentrations.

As shown in FIG. 3, strong solution from generator 20 is partially cooled in heat exchanger 60, is mixed with the dilute solution from absorber 50 at mixing point 18, is cooled through heat exchanger 70, flows through absorber 50 and then flows back to heat exchanger 60. Depending upon the operating conditions and the type of solution being used, a calculated and controlled amount of the dilute solution flows through heat exchanger 60 and into generator 20.

Many advantages result from operating the absorption cycle around the crystallization curve of the working solution, according to this invention. For example, solution heat exchangers 60 and 70 are reduced in heat duty and a portion of the heat normally recovered by such heat exchangers is lost to the cycle. With a 4% concentration bandwidth, the solution recirculation rate between generator 20 and absorber 50 can be 25 times higher than the refrigerant flow. In the modified absorption cycle according to this invention, such heat duty can be ameliorated, but not completely eliminated, by increasing the concentration width significantly. A relatively high concentration solution is only partially cooled and then mixed with the dilute solution before it is completely cooled in absorber 50, thereby stepping around the crystallization curve.

According to the absorption system and process of this invention, the solution heat exchanger can have approximately 50% lower heat duty than the solution heat exchangers of conventional absorption systems. The solution heat exchangers of this invention can operate over a temperature difference of approximately 80° F., rather than 20° F. as in conventional systems. The minimum absorber heat rejection temperatures, according to this invention, can be as high as 120° F., assuming 10° F. subcooling, while providing a 15° F. safety margin to crystallization. The spray absorption apparatus according to this invention can be operated at one concentration in a single spray process. The absorber solution heat exchanger, heat exchanger 70, can be easily directly air-cooled.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. An absorption system that operates around a crystallization curve of a solution with a crystallization limitation, the system comprising:

generator means for heating the solution and separating an absorbent of the solution from a refrigerant of the solution, said generator means comprising a solution inlet and an absorbent discharge;

condensor means for condensing said separated refrigerant, said condenser means in communication with and downstream of said generator means;

evaporator means for evaporating said condensed refrigerant, said evaporator means in communication with and downstream of said condenser means;

absorber means for absorbing said evaporated refrigerant into said absorbent, said absorber means comprising an absorber inlet, a distributor passing a spray of said absorbent through a refrigerant vapor without cooling of said solution, and a solution discharge;

a first heat exchanger having a solution pass in communication between said solution discharge and said solution inlet, said first heat exchanger having an absorbent pass in communication between said absorber inlet and said absorbent discharge;

a second heat exchanger comprising an absorber solution cooler independent from said absorber means, said second heat exchanger having a first pass in communication between a mixing point and said absorber inlet, wherein flows of the solution and said absorbent are combined to form a mixed solution at said mixing point and are cooled below an equilibrium temperature of said mixed solution; and control means for mixing at least a portion of the solution from said absorber discharge with said absorbent flowing to said absorber inlet and thereby diluting said absorbent.

2. A system according to claim 1 further comprising: an outdoor fan coil, and said second heat exchanger having a second pass in communication with said outdoor fan coil.

3. A system according to claim 1 further comprising: a fluid cooler, and said second heat exchanger having a second pass in communication with said fluid cooler.

4. A system according to claim 1 wherein said second heat exchanger is an air-cooled absorber cooler.

5. A system according to claim 1 wherein said generator means further comprise a refrigerant discharge, and said evaporator means further comprise a refrigerant inlet in communication with said refrigerant discharge.

6. A system according to claim 5 wherein said condensor means further comprise an air-cooled condensor having a condensor pass in communication between said refrigerant discharge and said refrigerant inlet.

7. A system according to claim 1 wherein said absorber means further comprise a spray absorber.

8. A system according to claim 1 wherein said absorber means further comprise a rotating disk distribution absorber.

9. A system according to claim 1 wherein said control means further comprise a balance valve having a valve inlet in communication with said solution discharge and a valve outlet in communication with said absorber inlet.

10. A system according to claim 1 further comprising a solution pump having a pump inlet in communication with said solution discharge and a pump discharge in communication with said solution inlet.

11. In an absorption system operating with a solution having a crystallization curve, wherein the system has a generator, a condensor downstream from the generator, an evaporator downstream from the condensor, an absorber downstream with respect to refrigerant flow from the evaporator, and a first heat exchanger transferring heat from an absorbent discharged from the generator to the solution discharged from the absorber, the improvement comprising:

the absorber comprising a distributor passing a spray of the absorbent through a refrigerant vapor without cooling of the solution;

a second heat exchanger comprising an absorber solution cooler independent from the absorber, said second heat exchanger having a first pass in communication between a mixing point and said absorber inlet, wherein flows of the solution and the absorbent are combined to form a mixed solution at said mixing point and are cooled below an equilibrium temperature of said mixed solution; and control means for mixing at least a portion of the solution discharged from the absorber with the absorbent flowing to an absorber inlet of the absorber and thereby diluting said absorbent.

12. In a system according to claim 11 wherein the control means mix at least a portion of the solution discharged from the absorber with the absorbent flowing to said absorber inlet continuously during operation of the absorption system whereby the absorbent discharged from the generator has a concentration greater than 64%.

13. In a system according to claim 11 further comprising: an outdoor fan coil, and said second heat exchanger having a second pass in communication with said outdoor fan coil.

14. In a system according to claim 11 wherein said second heat exchanger is an air-cooled absorber cooler.

15. In a system according to claim 11 wherein the condensor is an air-cooled condensor having a condensor pass in communication between said generator and said evaporator.

16. In a system according to claim 11 wherein said control means further comprise a balance valve having a valve inlet in communication with a solution discharge of the absorber and a valve outlet in communication with a solution inlet of the absorber.

17. An absorption process using a spray absorber and operating around a crystallization curve of a solution with a crystallization limitation, including the steps of:
(a) heating the solution to separate an absorbent of the solution from a refrigerant of the solution;
(b) condensing the separated refrigerant;
(c) evaporating the condensed refrigerant;
(d) absorbing the evaporated refrigerant into the absorbent as the absorbent is suspended in a spray without cooling the solution and forming the solution in a dilute state;
(e) mixing at least a portion of the diluted solution with the separated concentrated absorbent to form a mixture, cooling the mixture to a temperature below equilibrium, and returning the cooled mixture to an absorber for absorbing the evaporated refrigerant; and
(f) transferring heat from the separated absorbent to a remaining portion of the diluted solution.

18. A process according to claim 17 further comprising the step of transferring heat from the mixture of the separated concentrated absorbent and the diluted solution.

19. A process according to claim 18 wherein the heat from the mixture is transferred to an outdoor fan coil.

20. A process according to claim 18 wherein the heat from the mixture is transferred to an air-cooled absorber cooler.

21. A process according to claim 17 further comprising the step of passing refrigerant flow from a generator for heating the solution, through an air-cooled condensor for condensing the separated refrigerant, and to an evaporator for evaporating the condensed refrigerant.

22. A process according to claim 17 wherein the solution is water-lithium bromide.

23. A process according to claim 22 wherein the water-lithium bromide solution has a separated concentration of greater than 64% and a diluted concentration of approximately 62%.

24. A process according to claim 22 wherein the water-lithium bromide solution has a concentration bandwidth of approximately 4%.

25. In an absorption process operating with a solution having a crystallization curve, wherein the solution is heated to separate an absorbent of the solution from a refrigerant of the solution, the separated refrigerant is condensed, the condensed refrigerant is evaporated, the evaporated refrigerant is absorbed into the absorbent to form the solution in a dilute state, and heat is transferred from the separated absorbent to the diluted solution, the improvement including:

suspending the absorbent in a spray as the diluted solution is formed without cooling the solution, mixing at least a portion of the diluted solution with the separated absorbent to form a mixture, cooling the mixture to a temperature below equilibrium, and returning the cooled mixture to an absorber for absorbing the evaporated refrigerant.

26. In a process according to claim 25 further comprising the step of transferring heat from a mixture of the separated absorbent and the diluted solution.

27. In a process according to claim 26 wherein the heat from the mixture is transferred to an outdoor fan coil.

28. In a process according to claim 26 wherein the heat from the mixture is transferred to a fluid cooler.

29. In a process according to claim 26 wherein the heat from the mixture is transferred to an air-cooled absorber cooler.

30. In a process according to claim 25 further comprising the step of passing refrigerant flow from a generator for heating the solution, through an air-cooled condensor for condensing the separated refrigerant, and to an evaporator for evaporating the condensed refrigerant.

31. In a process according to claim 25 wherein the solution is water-lithium bromide.

32. In a process according to claim 31 wherein the water-lithium bromide solution has a separated concentration of greater than 64% and a diluted concentration of approximately 62%.

33. In a process according to claim 31 wherein the water-lithium bromide solution has a concentration bandwidth of approximately 4%.

* * * * *